H. W. BROWN.
HEADLIGHT REPLACEMENT.
APPLICATION FILED DEC. 23, 1919.
1,357,761.
Patented Nov. 2, 1920.
3 SHEETS—SHEET 1.
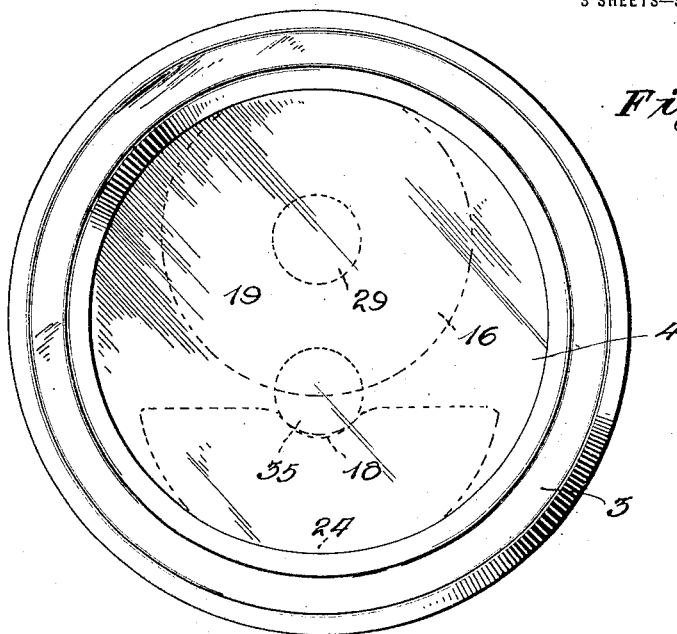
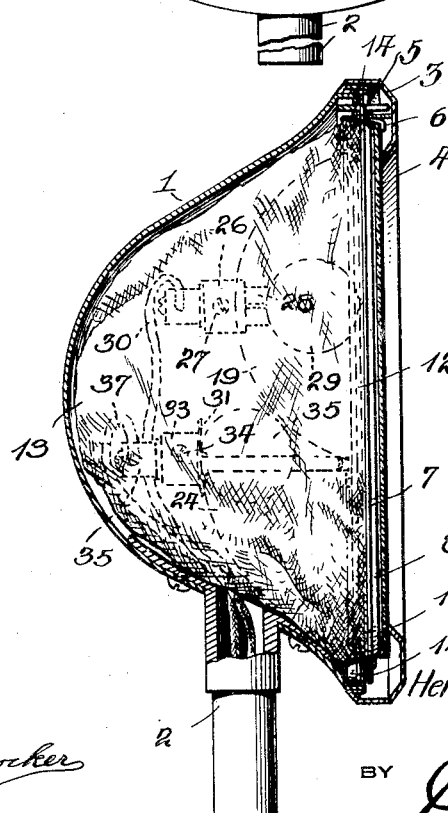
WITNESSES
Ernest A. Crocker
H. T. Chapman
Herbert W. Brown INVENTOR
BY
ATTORNEY

H. W. BROWN.
HEADLIGHT REPLACEMENT.
APPLICATION FILED DEC. 23, 1919.

1,357,761.

Patented Nov. 2, 1920.
3 SHEETS—SHEET 2.

Herbert W. Brown INVENTOR

WITNESSES

BY

ATTORNEY

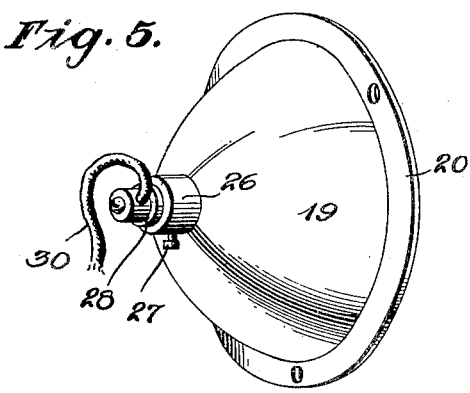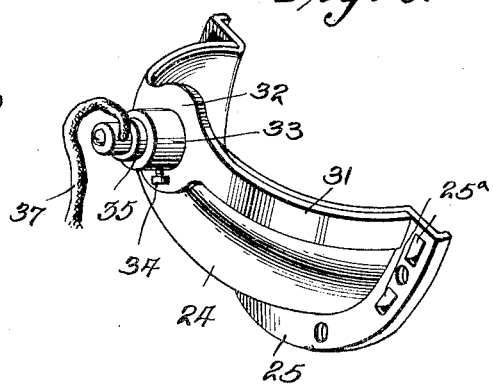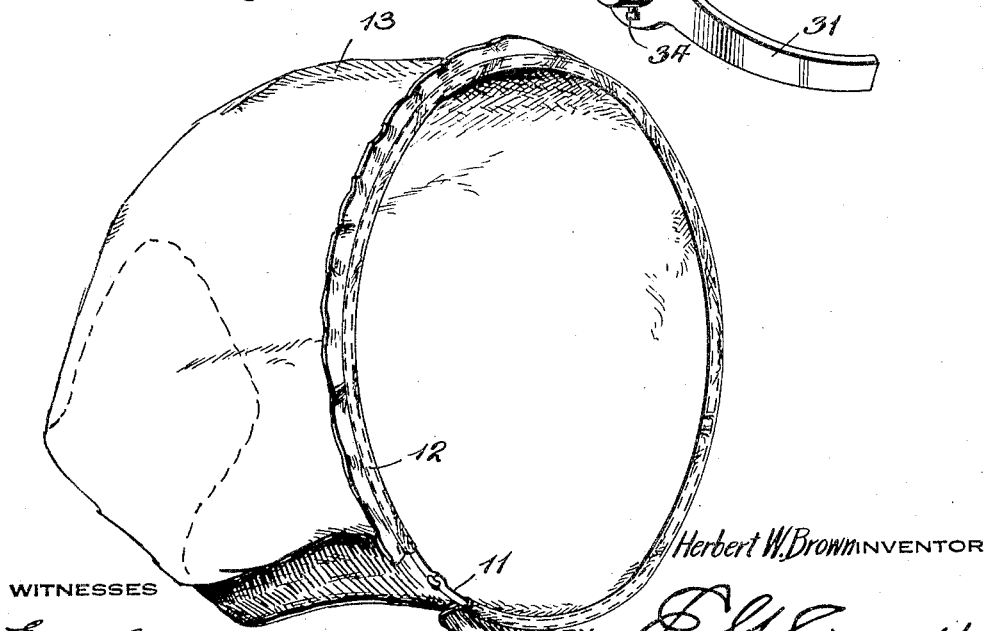

UNITED STATES PATENT OFFICE.

HERBERT W. BROWN, OF ASHLAND, OHIO.

HEADLIGHT REPLACEMENT.

1,357,761. Specification of Letters Patent. Patented Nov. 2, 1920.

Application filed December 23, 1919. Serial No. 346,978.

*To all whom it may concern:*

Be it known that I, HERBERT W. BROWN, a citizen of the United States, residing at Ashland, in the county of Ashland and State of Ohio, have invented a new and useful Headlight Replacement, of which the following is a specification.

This invention has reference to headlight replacements, and its object is to provide a replacement or substitute for the reflector and illuminating elements of standard headlights such as are initially furnished by automobile manufacturers with the automobiles.

While the invention is in some particulars adapted to various types of headlights, it is particularly intended for use in connection with automobile headlights and is designed especially to provide a replacement unit which may be substituted, without the necessity of the use of tools, for converting the light-projecting elements of a standard headlight into a headlight of much wider scope and adapting the headlight for use in locations where powerful beams of light are permitted, for instance on open country roads, or where more restricted lighting is required, as in city use, so that the driver of the vehicle may have ample light for driving purposes without producing any glare whatever with respect to a vehicle approached or approaching from the front, or may have brilliant illumination where road conditions are difficult.

The invention provides a face or supporting plate adapted to fit the front of a standard headlight casing and replace the ordinary reflector, and this plate is provided with superposed light-emitting openings, behind which reflectors are secured to the plate, and suitable electric lamp sockets are established in the reflectors to hold lamp bulbs in the focal axis of such reflectors. Such plate, with its reflectors and lamp sockets, comprises a replacement unit intended to be sold as such and to be substituted for the standard reflectors initially furnished with the headlight. This, however, does not preclude the initial installation of the invention without utilizing the replacement feature thereof.

To enlarge the usefulness of the invention, the light-emitting openings are superposed, and each backed up by a suitable reflector, one opening being of full circular contour, and the other opening of substantially semi-circular contour, although such particular contours may be somewhat changed.

The invention also includes numerous features which will appear hereinafter.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a face view of a headlight casing, showing the customary locking ring and cover plate and indicating the outlines of the light-emitting openings and the light-giving elements in dotted lines.

Fig. 2 is a section about midway of the width of the headlight casing, showing the light-producing and projecting elements in dotted lines because hidden by a dust cloth forming part of the replacement unit.

Fig. 5 is a rear perspective view of the main or upper reflector.

Fig. 6 is a similar view of the supplemental or lower reflector.

Fig. 7 is a perspective view of a reinforcement strip used in connection with the reflector of Fig. 6.

Fig. 8 is a perspective view of the dust cloth removed from the replacement unit.

Figure 3:
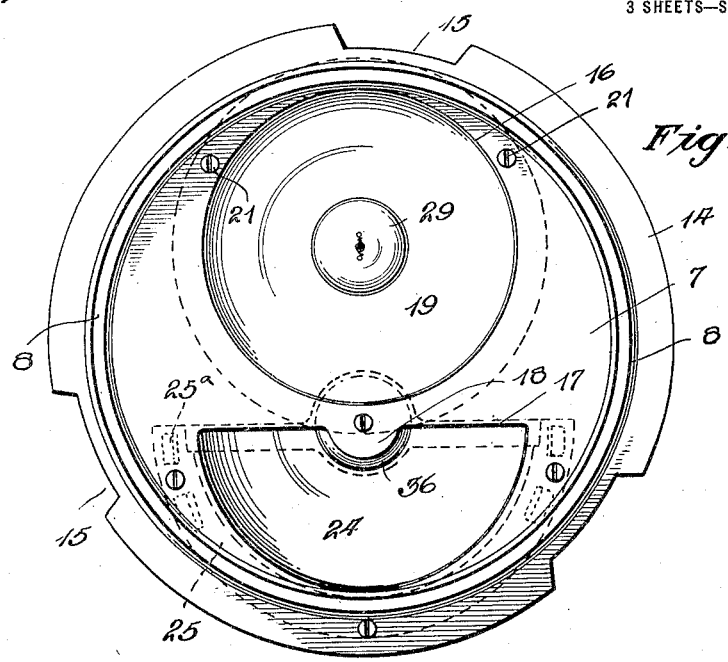
Fig. 3 is a face view of the replacement unit.
Figure 4:
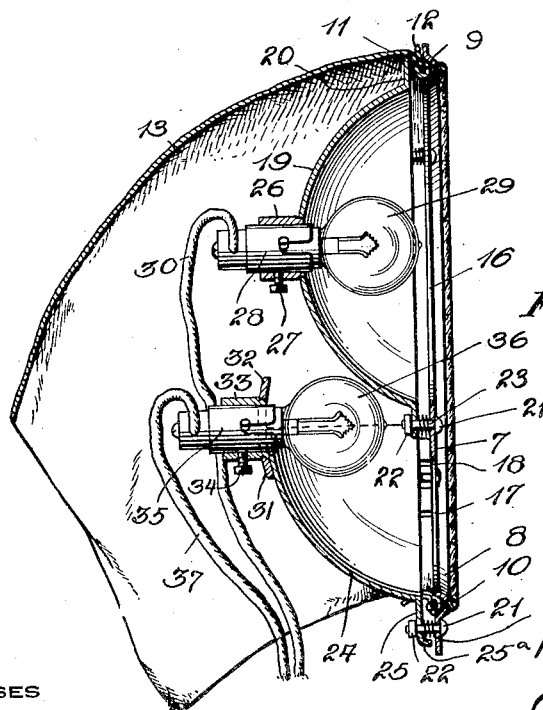
Fig. 4 is a front-to-rear section through the replacement unit, showing the dust cloth in place.

Referring to the drawings, and more particularly to Figs. 1 and 2, there is shown a headlight casing 1 of customary form and carried by a stem 2 by which the casing is secured to the automobile or whatever vehicle or the like upon which the headlight is to be used. For convenience of description, it will be considered that the headlight is designed for an automobile.

At the front or light-emitting end of the casing 1 there is provided the usual locking ring 3 arranged to hold the customary cover-glass 4.

It is customary to provide headlight casings at the light-emitting end with securing means 5 for the ring 3, the ring and mouth end of the casing being provided with coacting bayonet-catch means, whereby the ring 3 is applied or removed by a rotary motion, and when applied, is securely locked against accidental displacement. Moreover, the ring has holding clips 6 for maintaining the glass pane in place on the ring 3. The parts just described are common to numerous forms of automobile headlights and hence require no extended or specific description.

The replacement unit forming the subject of this invention includes a face plate 7 with a circumferential rib 8 adjacent to the outer or peripheral edge. The plate may be formed of sheet metal with the rib 8 pressed beyond the front face of the plate to form a seat 9 in the rear face of the rib. By producing a circumferential groove 10 in the outer face of the rib 8 there may be formed a seat for the customary cord or rope cushion with which headlights are provided to constitute a bearing for the rear face of the glass pane 4. The seat 9 may be utilized as a seat for a ring 11 carrying a hem 12 about the edge of a tubular or approximately tubular cloth 13 arranged at the rear of the face plate 7 to form a covering or dust cloth for parts carried by the face plate.

Beyond the rib 8, the face plate has a radial marginal extension or flange 14 with cut-outs 15 at suitable intervals to pass the hooks 5 and permit these hooks to engage over the adjacent portions of the extension 14 to lock the replacement to the casing. Usually there are three equi-distantly disposed holding devices on the casing, and in such case the face plate 7 has three equi-distantly disposed cut-outs 15.

The face plate is traversed by two openings 16 and 17, the opening 16 being of circular contour and the opening 17 being more or less crescent shaped, which is due to a mid-drop 18 of the face plate 7 into the contour of the opening 17.

Back of the opening 16 there is located a reflector 19 of full circular shape and preferably parabolic. The reflector 19 is provided with an outstanding marginal flange 20, the inner diameter of the reflector being somewhat greater than the diameter of the opening 16, so that the flange 20 is back of the solid or unbroken portion of the face plate 7 about the opening 16. Traversing the face plate 7 at intervals about the margins of the opening 16 and also traversing corresponding portions of the flange 20 are bolts or screws 21 each provided with a nut 22 for holding the reflector 19 to the face plate 7. For permitting adjustment of tilting of the reflector with respect to the plane of the face plate 7, each bolt or screw 21 is surrounded by a spring 23 between the inner surface of the face plate 7 and the outer surface of the flange 20. The spring 23 serves the purpose of holding the nut 22 from backing off when the reflector is tilted with respect to the face plate to cause the emitted beam of light to issue at a desired angle to the plane of the face plate, and also prevents rattling. Backing the opening 17 is another reflector 24 with a marginal outstanding flange 25 having an angular continuation 25$^a$ by means of which latter the reflector 24 is held a short distance away from the face plate and moreover is stiffened. The reflector 24 and its flange 25 represent but half of a complete circle, so that the reflectors 24 may be formed initially as completely circular and then cut in half diametrically. This, except for the labor of the diametric cut, permits the production of the reflectors 24 for half what it would cost to produce reflectors were they of greater extent than half a complete circle. The reflector 24 is secured to the face plate 7 by screws 21 provided with nuts 22, with one of the screws located near the bottom edge of the reflector 24 provided with a spring 23, the same as the reflector 19 and for a similar purpose.

The reflector 19 carries an axially-extended sleeve 26 made fast to the reflector in any suitable way and provided with a set screw 27. Entering the sleeve 26 and held therein by the set screw 27 is an electric socket 28 which may be of ordinary type and designed to receive the base of an electric lamp bulb 29 within the reflector 19 and at the other end to receive one end of an electric conductor 30. The socket and lamp may be of either the single or double contact type, but in the drawings the single contact is indicated.

The reflector 24, about the edge remote from the face plate 7, has a reinforcing band or strip 31 secured thereto, as by solder or other means, and this band at its central portion is expanded as shown at 32 to receive and hold a sleeve or collar 33 similar to the sleeve 26 and for a like purpose. The sleeve 33 is provided with a set screw 34 to receive and hold an electric lamp socket 35 projecting into the optical axis of the reflector 24 to there receive and hold the base of an electric lamp bulb 36, the other end of the socket receiving a conductor 37 similar to the conductor 30. The socket 35 is so situated that the lamp bulb 36 is located behind the drop portion 18 of the face plate 7, thereby hiding the light-giving portion of the lamp bulb 36 from direct view of an observer in front of the headlight.

The equipment of this invention is, as has been hereinbefore explained, designed to replace a portion of the standard assembly of headlights with which many types of automobiles are provided. This permits the owner of an automobile to obtain upon the market a unit by means of which the standard headlight may be changed by the owner, at relatively small cost, into a headlight structure of much wider range than the standard equipment. The replacement unit provides two reflectors and two lamps for each headlight, with one reflector and lamp producing a far-reaching beam of light for common road driving and the other reflector providing for road illumination of much higher intensity than customary in city driving and for parking with the source of light hidden from view and the range of light limited to a relatively short distance in front of the vehicle and of anti-glare characteristics without the necessity of providing special lenses for the purpose. The replacement unit also furnishes means whereby greater illumination than customary is permissible since both lamps and both reflectors may be employed so that a particularly dark and difficult roadway may be brilliantly illuminated far ahead and also in the immediate neighborhood of the front of the vehicle, such arrangement being highly advantageous under some circumstances.

Heretofore it has been necessary to provide a complete headlight outfit, but with the invention, all the advantages of such a complete lamp outfit are provided by the simple expedient of substituting the replacement unit of the invention for the standard reflector and lamp holder at a cost far less than that of a complete new headlight.

What is claimed is:

1. A replacement unit for the standard light-projecting member of a headlight wherein the headlight assembly is provided with a casing having a marginal portion from which fastening means for the headlight assembly project, comprising a face plate with superposed adjacent light-emitting openings therethrough, one opening being of full circular contour and the other opening of less than full circular contour, and reflectors carried by the plate on the rear face thereof back of the respective openings, said face plate having a marginal circumferential flange with peripheral cut-outs to pass the fastening devices on the casing, whereby the replacement unit may be readily substituted for the original standard light-projecting member.

2. A replacement unit for the standard light-projecting member of a headlight wherein the headlight assembly is provided with a casing having a marginal portion from which fastening means project, comprising a face plate with superposed adjacent light-emitting openings therethrough differing in contour, and reflectors carried by the plate on its rear face and each located back of a respective opening and provided in its optical axis with a socket for holding an electric lamp bulb, and the plate also having a radially-projecting flange beyond the rim with the flange provided with cut-outs spaced in accordance with the fastening means on the casing to pass said fastening means to lock the plate to the casing in place of the original or standard light-projecting member.

3. A replacement unit for the standard light-projecting member of a headlight wherein the headlight assembly is provided with a casing having a marginal portion from which fastening means project, comprising a face plate with superposed adjacent light-emitting openings therethrough of different contour, and reflectors carried by the plate on the rear face thereof back of the respective openings and corresponding generally to the contour thereof, and means in the optical axis of each reflector for carrying an electric light bulb, the face plate having a marginal radial flange with cut-outs shaped and spaced to receive the fastening means on the casing for holding the replacement unit to the casing.

4. A replacement unit for substitution for the standard light-projecting member of a headlight, comprising a metal face plate with superposed circular and approximately semi-circular openings therethrough, reflectors and means for holding light-emitting members at the rear of the openings with the reflectors secured to the rear face of the face plate and said face plate having a circumferential rib projecting from its front face in surrounding relation to the openings and with a radial flange exterior to the rib.

5. A replacement unit for substitution for the standard light-projecting member of a headlight, comprising a sheet metal face plate with a plurality of adjacent differently-shaped openings therethrough, and reflectors with means for carrying electric lamp bulbs located back of the openings and secured to the rear of the face plate, said face plate having a circumferential rib pressed into its rear face and projecting from its front face and there formed with a circumferential groove, the rib surrounding the openings and the face plate beyond the rib being formed into a radial flange with cut-outs to pass fastening means on the headlight casing receiving the replacement unit.

6. A replacement unit for substitution for the light-projecting member of a standard headlight, comprising a plate of a size and shape to fit the headlight casing from which the light-emitting member has been removed, said plate having a plurality of openings of different contour for emitting light, reflectors fast to the plate back of the openings, and a cloth member carried by the face plate on its rear face in inclosing relation to the reflectors and openings for protecting the reflectors from access of dust.

7. A replacement unit for substitution for the light-projecting member of a standard headlight, comprising a plate of a size and shape to fit the headlight casing from which the light-emitting member has been removed, said plate having a plurality of openings of different contour for emitting light, reflectors fast to the plate back of the openings, and a cloth member carried by the face plate on its rear face in inclosing relation to the reflectors and openings for protecting the reflectors from access of dust, the face plate being provided with a seat for packing on the exterior of the face plate in surrounding relation to the openings whereby the packing excludes dust from the outer face of the face plate.

8. A replacement unit for substitution for the standard light-projecting member of a headlight, comprising a face plate with light giving and light reflecting means carried thereby, and the face plate being constructed to transmit light through it, and a dust excluding cloth carried by the face plate in inclosing relation to the reflecting means.

9. A replacement unit for substitution for the light-projecting member of a standard headlight, comprising a plate of a size to fit the headlight casing from which the light-emitting member has been removed, said plate having a plurality of openings of different contours for emitting light, reflectors fast to the plate back of the openings, and a dust excluding inclosure for the reflectors forming part of the replacement unit, and introducible therewith into the headlight from which the light-emitting member has been removed.

10. In a headlight structure, a face plate with a light-emitting opening therethrough, a reflector back of the opening, and means for securing the reflector to the face plate comprising bolts or screws with springs encircling the screws between the face plate and reflector whereby the reflector may be tilted with respect to the plane of the face plate and the loosening of the screws is prevented by the tension of the springs.

11. A light-emitting unit for headlights comprising a face plate with a light-emitting opening therethrough, a reflector with an outstanding marginal flange, means carried by the reflector for carrying an electric lamp bulb, and securing means for fastening the marginal flange of the reflector to the face plate comprising screw members engaging both the plate and reflector flange and surrounded with springs between the plate and flange whereby the reflector is elastically and adjustably spaced from the face plate.

12. In light-projecting means for a headlight structure, a face plate with a light-emitting opening therethrough of approximately semi-circular shape, a reflector of less than full circular outline with an outstanding marginal flange having punched-out portions constituting stops adjacent to the diametric portion of the reflector, and fastening means connecting the marginal flange of the reflector with the face plate, one fastening means being located at a part of the flange remote from the diametric part of the reflector and constituting adjusting means whereby the reflector may be rocked about the diametric portion of the reflector.

In testimony, that I claim the foregoing as my own, I have hereto affixed my signature in the presence of two witnesses.

HERBERT W. BROWN.

Witnesses:
H. A. McKenutz,
R. A. Brown.